United States Patent
Suzuki et al.

(10) Patent No.: US 6,705,659 B2
(45) Date of Patent: Mar. 16, 2004

(54) DISPLAY DEVICE FOR VEHICLES

(75) Inventors: Koji Suzuki, Saitama (JP); Koichi Shimamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/814,877

(22) Filed: Mar. 23, 2001

(65) Prior Publication Data

US 2001/0028176 A1 Oct. 11, 2001

(30) Foreign Application Priority Data

Mar. 23, 2000 (JP) ........................................ 2000-082077

(51) Int. Cl.⁷ .............................................. B60K 20/08
(52) U.S. Cl. .......................................... 296/70; 180/90
(58) Field of Search ............................... 296/70; 180/90

(56) References Cited

U.S. PATENT DOCUMENTS

| | | | | |
|---|---|---|---|---|
| 2,855,066 | A | * | 10/1958 | Nallinger |
| 4,194,587 | A | * | 3/1980 | Shino et al. |
| 4,718,512 | A | * | 1/1988 | Miyazaki |
| 6,239,925 | B1 | * | 5/2001 | Ardrey et al. |

FOREIGN PATENT DOCUMENTS

| | | |
|---|---|---|
| FR | 1 158 086 | 10/1956 |
| JP | 63 049556 | 7/1988 |
| JP | 1275286 | 11/1989 |
| JP | 239986 | 3/1990 |

OTHER PUBLICATIONS

German Patent and Trademark Office Action dated Mar. 25, 2002.

* cited by examiner

Primary Examiner—Joseph D. Pape
(74) Attorney, Agent, or Firm—Birch, Stewart, Kolasch & Birch, LLP

(57) ABSTRACT

An instrument panel of a motorcycle includes several dials, one of which is a speedometer, and also includes a liquid crystal panel which displays characters and other graphical information. Either the dials or the liquid crystal panel includes a step. The surface of the liquid crystal panel is located in a lower position closer to the driver compared with the dials. Visors are used which project toward the driver for interrupting the incidence of external light onto the instrument panel in order to ensure easy viewing of the instruments. A first visor is provided for shading the dials, and a separate second visor is mounted between the dials and the liquid crystal panel. Because the liquid crystal panel is shaded by the second visor, the first visor for shading the dials can be decreased in the amount of projection toward the driver.

20 Claims, 5 Drawing Sheets

DISPLAY DEVICE FOR VEHICLES

BACKGROUND OF THE INVENTION

1. Field of the Invention

The present invention relates to a display for vehicles and, more particularly, to a display device for vehicles which has a visor for preventing the incidence of external light.

2. Description of the Background Art

In a vehicle such as a motorcycle or a convertible in which display devices on an instrument panel are likely to be exposed to external light, or in a sports car in which a front window is mounted at an acute angle of inclination, a visor is mounted to prevent the incidence of the external light to the display surface, or to prevent the reflected rays of sunlight from a cover lens of the display devices from entering the range of sight of the rider (or driver).

FIG. 6 is a side view of a convent dashboard known in the art including a visor. In this drawing, the instrument panel P located in the upper part of the dashboard M is extended to form the visor V, thereby preventing incidence of the external light S to the dashboard M.

The use of the visor V of the length L1 can protect the first display device D1 located on the dashboard M from the external light S falling from above. Recently it has been proposed to set a second display device D2 obliquely below the first display device D1. To protect the eyes of the rider R from the light falling onto the position of the second display device D2 and from the reflected light from the cover lens, the visor V is required to be extended to the length L2.

However, if the visor V is increased in length, the rider's vision to the dashboard M will be limited. Also if the visor V is extended with the distance between the rider and the vehicle body left unchanged, the distance between the rider and the display surface will increase, resulting in a hard-to-view display. Also, a large visor will spoil the appearance and design of the vehicle.

In Japanese Unexamined Patent Publication No. H1-275286 and Japanese Unexamined Utility Model Publication No. H2-39986, the vertical arrangement of two displays in a motorcycle has been disclosed, in which the upper display is placed toward the rear of the vehicle, that is, toward the rider. In the motorcycle, the light falling from above onto the lower display can be prevented by the upper display.

According to the motorcycle disclosed in the patent and utility model stated above, it is not necessary to take into account the lower display when determining the length of the visor. However, there exist such problems that the lower display is located far from the rider and that the light shielding range and sight of the lower display are unequivocally determined. Therefore, it is difficult to set the shielding range and sight with the lower display taken into consideration.

SUMMARY OF THE INVENTION

It is therefore an object of the present invention to provide a display device for vehicles that can solve the above problems by preventing the incidence of external light onto a plurality of display surfaces, thereby providing an easy-to-view display surface for the rider.

To attain the above-described object, the display device for vehicles of this invention is provided with an instrument panel including a plurality of display sections. The first feature of this display device is to comprise a first visor mounted above the instrument panel, and a second visor mounted in the boundary position of the display section to divide the instrument panel surface into upper and lower zones as viewed from the rider.

According to the first feature, the instrument panel is divided into the upper and lower zones, and the lower display section is shaded by the second visor. Therefore, the size of the first visor may be determined taking into account the interruption of light falling onto the upper display section. It is therefore possible to decrease the projection amount of the first visor toward the rider. Furthermore, because a plurality of display sections is divided by the second visor, the rider can easily recognize information displayed on the plurality of display sections.

The second feature of this invention lies in that, of the plurality of display sections divided by the second visor, the display surface of the lower display section is located closer to the rider than the display surface of the upper display section.

According to the second feature, the lower display section can be extended toward the rider, making it possible to furnish a wide display surface area. The incidence of the external light can thus be prevented by the second visor by increasing the display surface area.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 5:
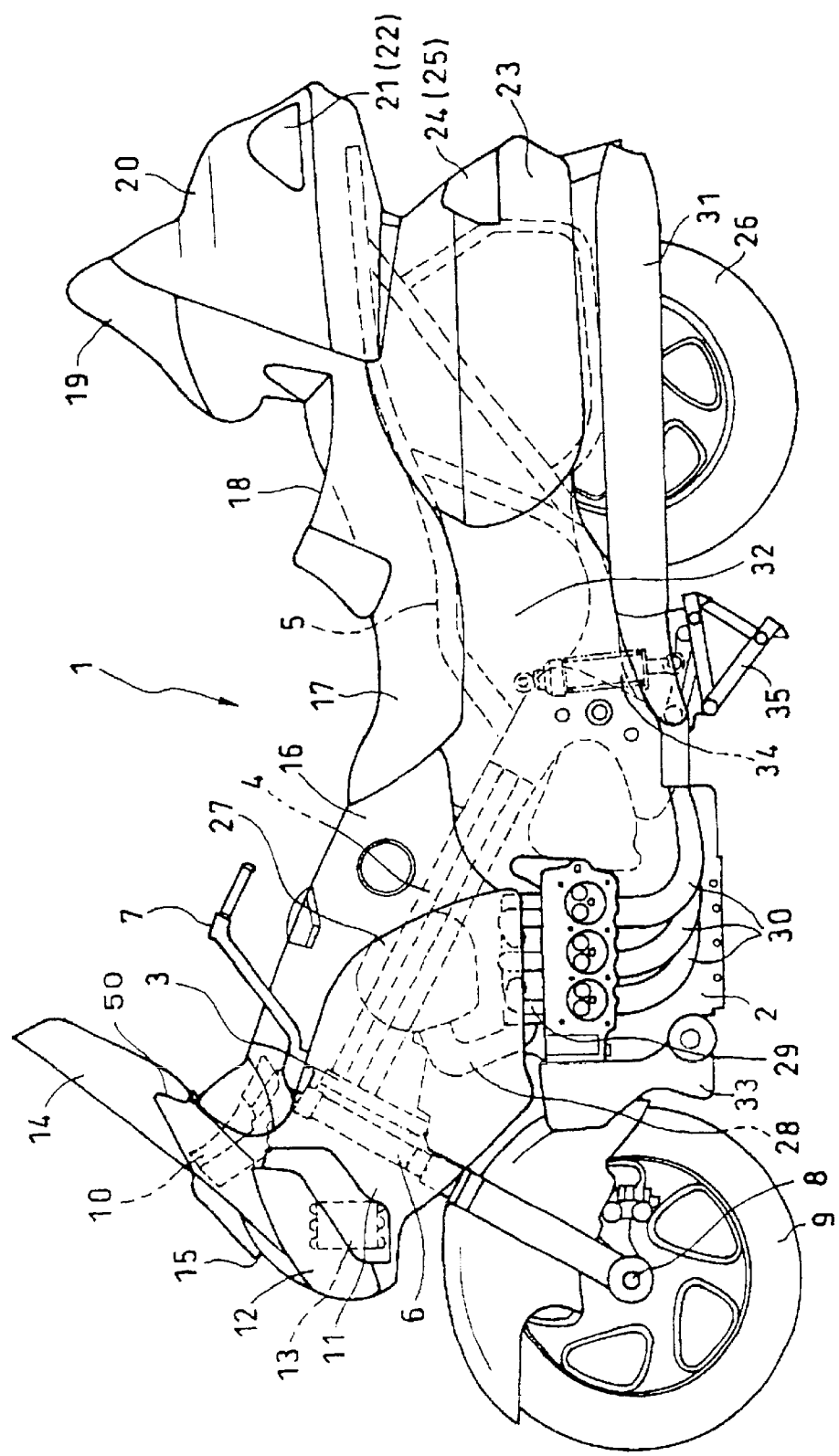
FIG. 5 is a side view of a motorcycle mounted with a display device according to the one embodiment of this invention.
Figure 6:
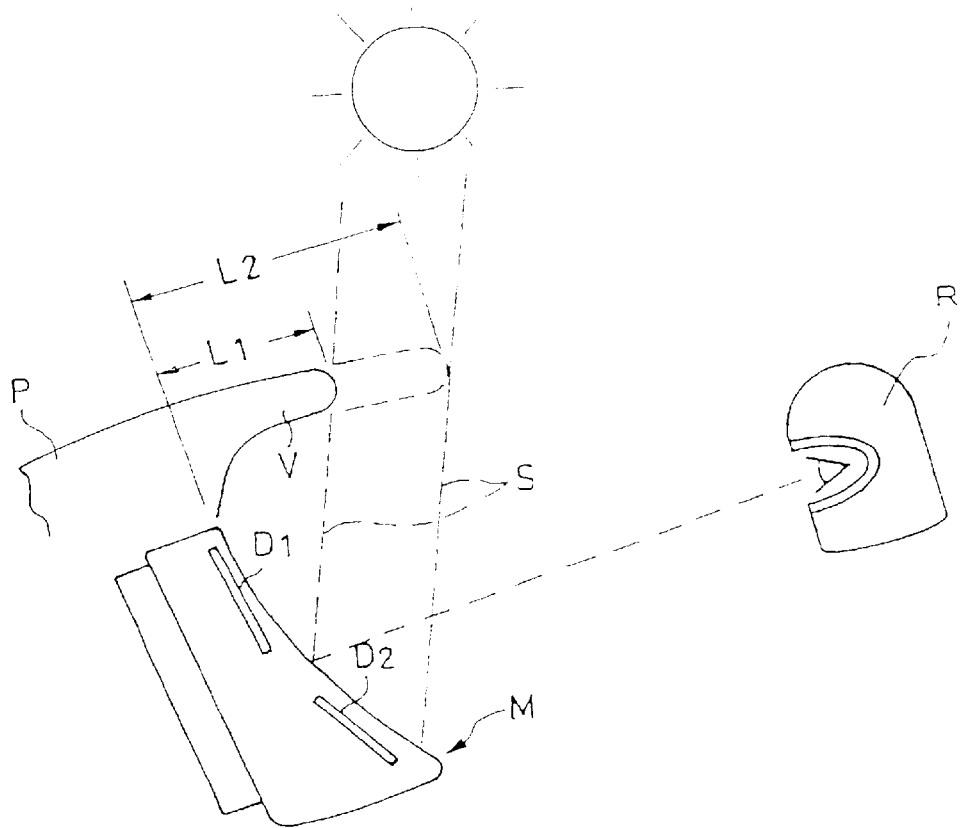
FIG. 6 is a schematic sectional view of a major portion of a conventional dashboard of a vehicle showing a relationship in position between of length of the visor and the display section.

A preferred embodiment of a display device for vehicles according to this invention will now be described with reference to the accompanying drawings. FIG. 5 is a side view showing the external appearance of a motorcycle mounted with a display device according to the one preferred embodiment of this invention. In the drawing, the motorcycle 1 (hereinafter referred to as the vehicle) is mounted with a horizontal opposed six-cylinder engine 2.

The frame structure of the vehicle is comprised of a twin-frame type main frame 4 which is bifurcated to right and left frames extending rearwardly from a steering head 3, and a rear frame 5 connected to the rear end of the main frame 4. A front fork 6 is composed of two pipes arranged on the right and left sides in the direction of travel, and is installed to the steering head 3. The front fork 6 is thus rotatable in the steering direction.

A handlebar 7 is secured on the upper part of the steering head 3, on the top bridge. A front wheel axle 8 is mounted at the lower end of the front fork 6. A front wheel 9 is rotatably supported on the front wheel axle 8.

The display device is mounted forwardly of the handlebar 7. The display device includes a meter unit 10, including a display panel and a control unit. A visor 50 is provided for the meter unit 10 for protecting the meter unit 10 from the external light. The visor 50 is for shading the upper part of the display surface of the meter unit 10. To shade the lower display surface, a non-illustrated second visor is further provided. A display surface illuminating system is installed on the meter unit 10, and a light control device is installed for adjusting the luminance of the illuminating system. The visor and light control device will be described in detail later.

A lens surface (clear lens) 12 for the lighting device is attached at the front of a front fairing (cowling) 11 which covers the front part of the vehicle 1. A ballast 13 is housed inside of the front cowling 11 for a discharge lamp used as the lighting device. A windshield 14 is installed above the front cowling 11, and an air inlet 15 is formed near the mounting portion of the windshield 14.

A fuel tank 16 is mounted on the main frame 4. A rider's seat 17 and a pillion seat 18 are arranged to the rear of the fuel tank 16. The rider's seat 17 and the pillion seat 18 are mounted on the rear frame 5. The pillion seat 18 is formed unitarily with the rider's seat 17, and has a backrest 19. A rear trunk 20 is provided behind the backrest 19. A rear stop light 21 and a blinker light 22 are also mounted behind the rear trunk 20. Side trunks 23 are mounted beneath the rear trunk 20 on the right and left of the rear wheel 26. A set of rear stop lights 24 and blinker lights 25 are mounted at the rear of the side trunks 23.

An air cleaner 27 is mounted forwardly of the lower part of the fuel tank 16. An intake manifold 29 extends from a throttle body 28 mounted in front of the air cleaner 27. The intake manifold 29 is connected to each of three cylinders oppositely arranged on both the right and left sides of the vehicle. A fuel injection system (not shown) is located upstream of each of these cylinders. An exhaust manifold 30 is installed from the engine 2 toward the rear. The exhaust manifold 30 is connected to a muffler 31.

Both sides under the rider's seat 17 are covered with side covers 32, and a front lower cowling 33 is located at the front of the engine 2. A rear cushion 34 is disposed under the rider's seat 17. The rear cushion 34 is connected to a hydraulic unit (not shown) which is capable of electrically adjusting the spring force to provide the initial weight application to the suspension according to the rider's weight. The vehicle 1 can be supported up on a stand 35.

Figure 2:
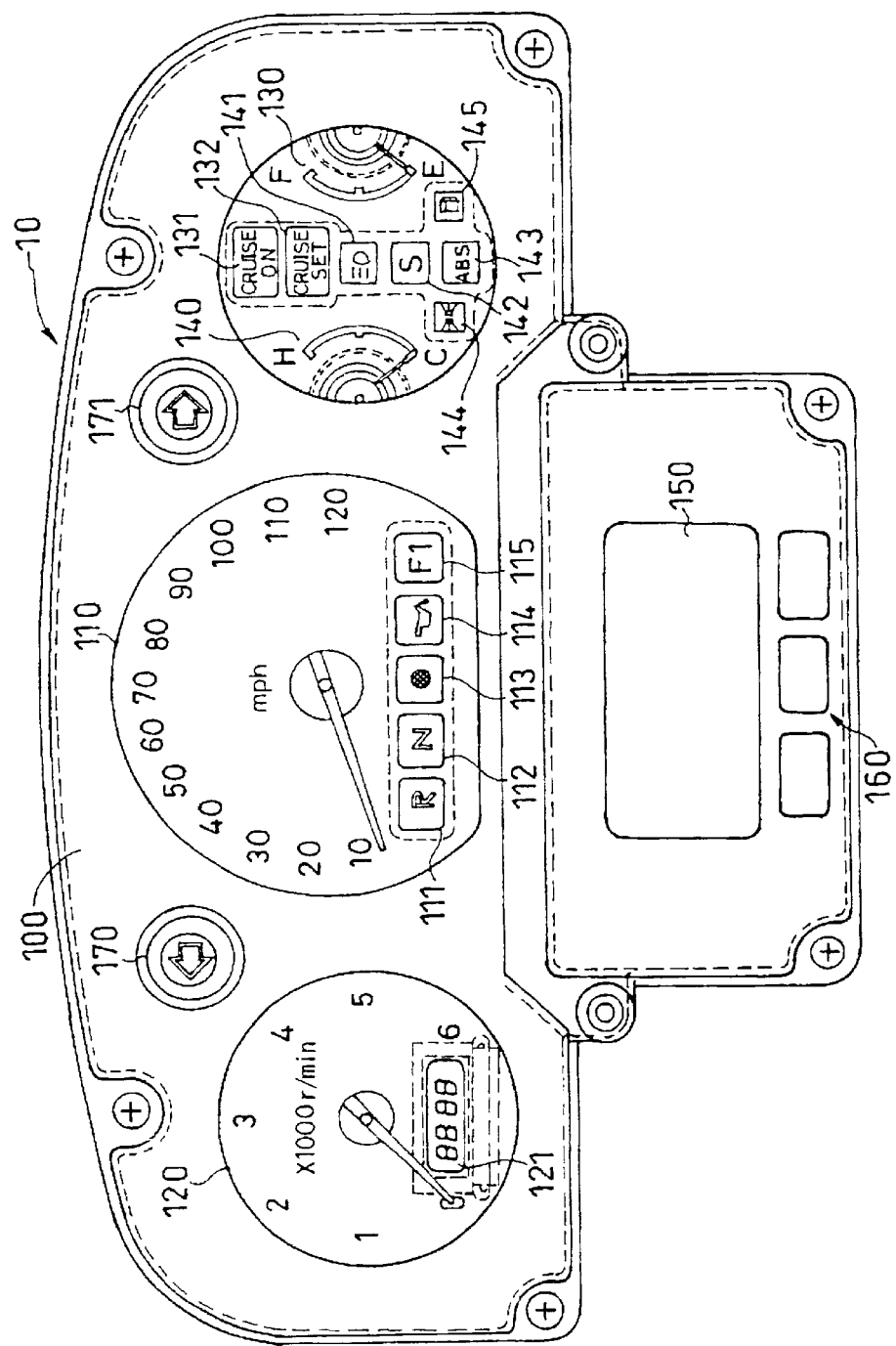
FIG. 2 is a front view of the meter unit according to one embodiment of this invention.

Next, the panel face of the meter unit 10 will be explained. FIG. 2 is a plan view of the meter unit as viewed from the rider's seat side of the motorcycle. In FIG. 2, the speedometer 110 is located at the central part of the instrument panel 100 mounted above the meter unit 10. Mounted on the left is a tachometer 120, and mounted on the right are a fuel gauge 130 and a water temperature gauge 140. An information display panel 150 is provided beneath the instrument panel 100 which displays information, characters, and other graphic symbols displaying information on the selection of radio and wireless communication stations and sound volume, and its control switch 160.

A gearshift REVERSE display lamp 111, a NEUTRAL display lamp 112, an oil indicator 114, and a fuel injection (FI) warning light 115 are disposed in the speedometer 110. A light sensor 113 for light control is installed between the NEUTRAL display lamp 112 and the oil indicator 114. Between the fuel gauge 130 and the water temperature gauge 140 are installed vertically in one row an AUTO CRUISE indicating lamp 131, an AUTO CRUISE SET indicating lamp 132, a HIGH-BEAM indicating lamp 141, a SIDE STAND UP warning light 142, and an ABS (anti-lock brake system) warning light 143.

A light on-off indicator 144 is mounted on the left side of the ABS warning light 143, and a fuel empty indicator 145 is mounted on the right side of the ABS warning light 143. A clock 121 is mounted below the tachometer 120. Blinker indicators 170 and 171 are provided in the upper right and left of the speedometer 110.

Figure 1:
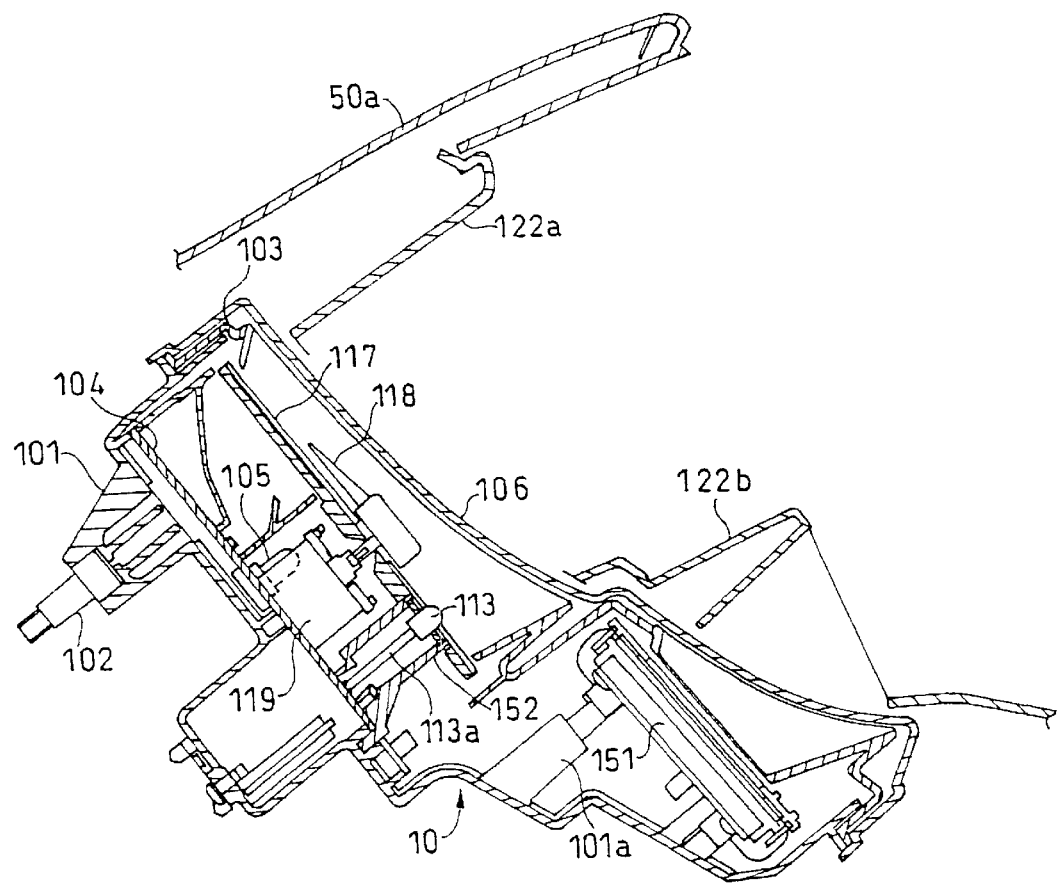
FIG. 1 is a side sectional view of a meter unit.

FIG. 1 is a sectional view showing the structure of the meter unit 10. In the drawing, the case of the meter unit 10 includes a lower case 101, an upper case 103, a bottom plate 104, and a lens 106. On the lower case 101 is installed a bolt 102, by which the meter unit 10 is secured to the front cowling 11. The upper case 103 is mounted at the front of the lower case 101, and the lower case 101 is fitted with the case bottom plate 104.

A translucent dial 117 is installed between the case bottom plate 104 and the upper case 103 which serves as the display surface of the instrument panel 100. A liquid crystal panel 151 is located obliquely below the dial 117 as the body of the information display panel 150 which is supported by the stem 101a raised from the lower case 101. As illustrated, between the dial 117 and the liquid crystal panel 151 there is a difference in level. The surface of the liquid crystal panel 151 is set in a position closer to the rider's eyes.

The shaft of the pointer 118 is installed through the dial 117, and the light sensor 113 is installed with its forward end exposed on the dial 117. Also installed are a driving unit 119 of the pointer 118, a lead (leg portion 113a of the light sensor 113), and a lamp 105 applying the light translucently from behind the dial 117 to illuminate characters or graphic symbols. Also provided are a lead 113a, and a plate 152 for covering the lower part of the head of the light sensor 113 to thereby prevent the direct incidence of light from the lamp 105 to the light sensor 113. Because of the use of this plate 152, the sensor 113 can accurately adjust the external light without an influence of the light of the lamp 105.

A photoelectric transducer element such as a phototransistor is used as the light sensor 113, which outputs the luminance to the later-described light control device, that is, a signal corresponding to the light intensity over the dial 117. The light control device functions to determine the luminance on the basis of the characteristic and output of the light sensor, then controlling the luminance of the lamp 105 to a predetermined value. An acrylic resin lens 106 is used at the front of the meter unit 10 to protect each component. The lens 106 is so formed as to cover both the instrument panel 100 and the information display panel all together. The use of this lens 106 can simplify the lens molding and assembling processes more efficiently than separate lenses covering the instrument panel 100 and the information display panel 150.

Figure 3:
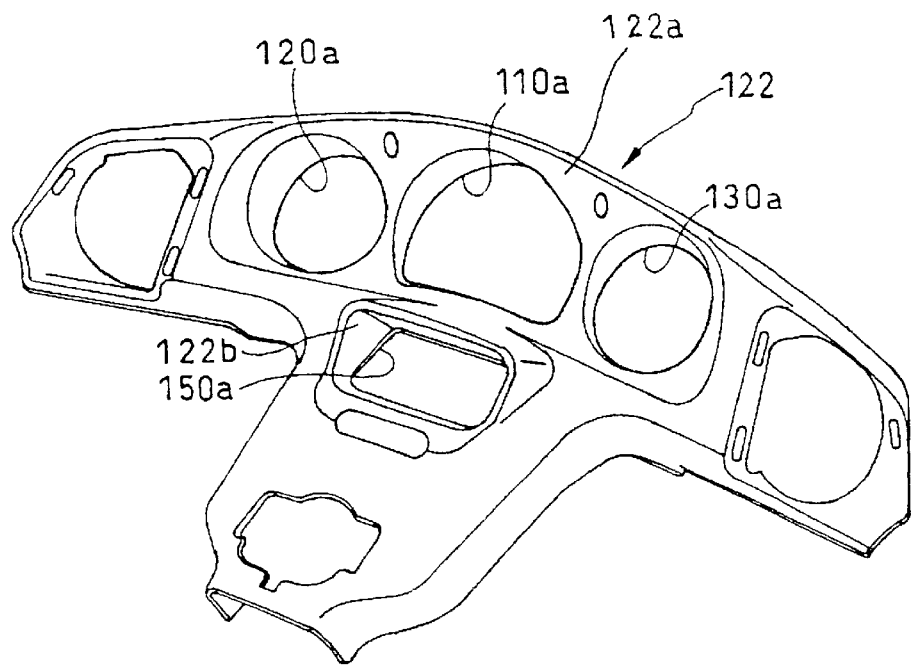
FIG. 3 is a perspective view of a panel cover.

A panel cover 122 is mounted at the front of the meter unit 10. For the panel cover 122, refer to the perspective view of FIG. 3. The panel cover 122 is formed to cover both the meter unit 10 and the right and left speaker panels (not shown) as one body. Holes 120a and 110a formed in the panel cover 122 align with the display position of the tachometer 120 and the speedometer 110 respectively. The hole 130a is formed to correspond to the display position of the fuel gauge 130 and the water temperature gauge 140. Furthermore, the hole 150a is so formed as to correspond to the display position of the information display panel 150.

The upper overhang section 122a of the panel cover 122 forms a part of the visor 50 for the instrument panel 100, while the lower overhang section 122b forms a visor for the information display panel 150. The top end of the overhang section 122a is covered with the body 50a of the visor 50 extending upwardly toward the rider. The lower part of the visor body 50a is secured, together with the meter unit 10, to a non-illustrated stay covered with the front cowling 11.

The instrument panel 100 and the information display panel 150 have a mutual step as described above. However, because the lower overhang section 122b is provided as the second visor between the instrument panel 100 and the information display panel 150, the mutual step and a step formed on the lens 106 corresponding to this step are hard to recognize.

Figure 4:
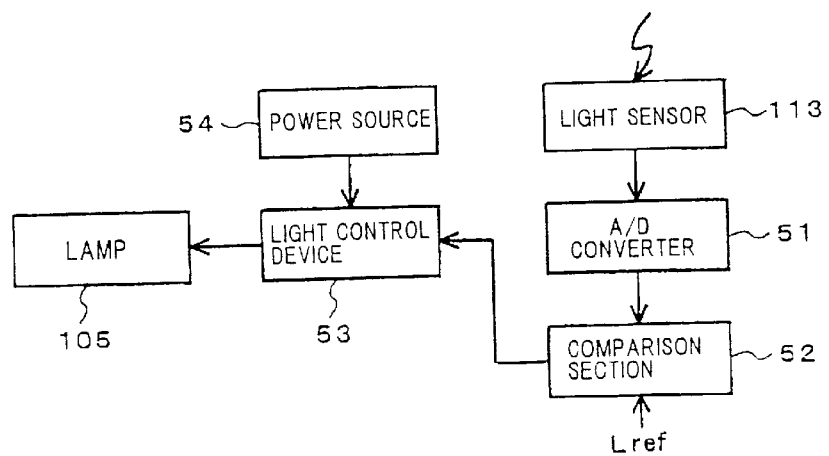
FIG. 4 is a block diagram showing a major portion of a light control device.

FIG. 4 is a block diagram showing the structure of a major portion of the light adjusting device. In the drawing, the light sensor 113 produces a light current corresponding to the intensity of the incident light. The light current is converted into a digital signal by an A/D converter 51. At the comparison section 52, the digital signal is compared with the reference illumination value Lref. The comparison section 52 outputs, to the light control device 53, an Up signal when the value of the digital signal thus compared is less than the reference illumination value Lref, and a Dn signal when the value of the digital signal is greater than the reference illumination value Lref. The reference illumination value Lref has a dead zone for stabilization of operation. The light control device 53 responds to a signal outputted from the comparison section 52. In the case of the Up signal, the current to be supplied from the power source 54 to the lamp 105 is increased. Conversely, in the case of the Dn signal, the current to be supplied from the power source 54 to the lamp 105 is decreased.

In the present embodiment, the illumination on the display surface of the instrument panel 100 where information are practically displayed is detected, to thereby enable controlling the luminance of the light source to a reference value.

With the present invention, it is possible to prevent external light from falling onto the display surface without increasing the amount of projection of the visor toward the rider, while providing a wide display surface. The rider can easily recognize information displayed on the divided display sections, and a wide display surface area is obtained. If the display surface is mounted close to the rider, the incidence of the external light can be prevented by the second visor, so that the dashboard will become easy to observe.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A display device for a vehicle having an instrument panel with a plurality of display sections, said display device comprising:
a visor with a panel cover, said panel cover having a first visor section and a second visor section integrally formed thereon, said first visor section being located above said instrument panel, and said second visor section being located in a boundary position of said display sections to divide a surface of said instrument panel into upper and lower zones as viewed from a driver, wherein the first visor section is covered with a visor body extending upwardly and rearwardly from the first visor section toward a rider of the vehicle.

2. The display device according to claim 1, wherein a display surface of a display section in said lower zone is closer to the driver than a display surface of a display section in said upper zone.

3. The display device according to claim 1, wherein said second visor section is shorter in a widthwise direction of the vehicle than said first visor section.

4. The display device according to claim 1, wherein said second visor extends rearwardly farther than said first visor.

5. The display device according to claim 1, wherein said second visor section includes a stepped portion.

6. The display device according to claim 1, wherein said instrument panel is mounted in a forwardly tilted direction and the visor body covering the first visor section extends rearwardly beyond the upper zone of the instrument panel to a point above the lower zone of the instrument panel.

7. The display device according to claim 6, wherein said covering lens includes a first stepped portion, and said second visor section includes a second stepped portion overlying said first stepped portion of said covering lens.

8. The display device according to claim 1, wherein said second visor section has a rectangular external configuration.

9. The display device according to claim 1, wherein said panel cover is formed with a plurality of holes disposed between said first visor section and said second visor section, each of said holes being aligned with one of a plurality of gauges on said instrument panel.

10. The display device according to claim 1, wherein said second visor section is shorter in length than said first visor section and extends rearwardly farther than said first visor section.

11. The display device according to claim 10, wherein said instrument panel includes a covering lens, said covering lens including a first stepped portion, and said second visor section includes a second stepped portion overlying said first stepped portion of said covering lens.

12. A display device for a vehicle comprising:
an instrument panel having a forwardly located display section and a rearwardly located display section as viewed by a driver of the vehicle;
a visor with a panel cover, said panel cover having a first visor section and a second visor section integrally formed thereon, said first visor section being located above said forwardly located display section, and said second visor section being located between said forwardly located display section and said rearwardly located display section, and said panel cover having an arc-shaped upper edge for fitting adjacent to a curved windshield and being attached to an inner side of a cowling of the vehicle.

13. The display device according to claim 12, wherein said second visor section is shorter in a widthwise direction of the vehicle than said first visor section.

14. The display device according to claim 12, wherein said instrument panel is mounted in a forwardly tilted direction, and a visor body covering the first visor section extends rearwardly to a point above the second visor section.

15. The display device according to claim 12, wherein said second visor section includes a stepped portion.

16. The display device according to claim 12, wherein said instrument panel includes a covering lens.

17. The display device according to claim 16, wherein said covering lens includes a first stepped portion, and said second visor section includes a second stepped portion overlying said first stepped portion of said covering lens.

18. The display device according to claim 12, wherein said second visor section formed integrally on said panel cover has a rectangular external configuration, and a hole is formed within said rectangular external configuration to correspond to a display position of said rearwardly located display section.

19. The display device according to claim 12, wherein said second visor section is shorter in length than said first visor section and extends rearwardly farther than said first visor section.

20. The display device according to claim 19, wherein said instrument panel includes a covering lens, said covering lens including a first stepped portion, and said second visor section includes a second stepped portion overlying said first stepped portion of said covering lens.

* * * * *